(12) United States Patent
Romero

(10) Patent No.: US 6,334,622 B1
(45) Date of Patent: Jan. 1, 2002

(54) PORTABLE GAS CART

(75) Inventor: Aldian Roman Romero, 12257 Fremont St., Yucaipa, CA (US) 92399

(73) Assignee: Aldian Roman Romero, Yucaipa, CA (US)

( * ) Notice: Subject to any disclaimer, the term of this patent is extended or adjusted under 35 U.S.C. 154(b) by 0 days.

(21) Appl. No.: 09/678,247

(22) Filed: Oct. 4, 2000

(51) Int. Cl.$^7$ ................................................. B62B 1/06
(52) U.S. Cl. ..................................... 280/47.26; D34/24
(58) Field of Search ........................... 280/47.24, 47.26, 280/47.12, 47.27, 47.32, 47.33, 47.34, 47.21; D34/24, 26

(56) References Cited

U.S. PATENT DOCUMENTS

| | | | | |
|---|---|---|---|---|
| 1,244,030 A | * | 10/1917 | Cave ............................ | 239/71 |
| D174,418 S | * | 4/1955 | Ewing et al. ................. | D34/24 |
| 4,802,515 A | * | 2/1989 | Pytryga et al. ............... | 141/97 |
| D333,543 S | * | 2/1993 | Rodriguez .................... | D34/26 |
| D432,283 S | * | 10/2000 | Mohns ......................... | D34/24 |

* cited by examiner

Primary Examiner—Robert J. Oberleitner
Assistant Examiner—Melanie Torres
(74) Attorney, Agent, or Firm—Aldian R. Romero

(57) ABSTRACT

The present invention is a metal caddy, or cart used for the safe transportation of flammable gas cylinders. The caddy exceeds current O.S.H.A safety mandate pertaining to transportation and storage of flammable gas cylinders in that it incorporates into its physical structure, a fully encompassing cylinder cage work and a unique "three point" weight distribution which leave two wheels free-standing, resulting in complete immobility when not in transport. The cart is made with ergonomic consideration. One of the most noted attributions of the caddy is a "built in" fire extinguisher receptor, so as to enable fire suppression capability close at hand.

7 Claims, 2 Drawing Sheets

1

PORTABLE GAS CART

CROSS-REFERENCE TO RELATED APPLICATIONS

"Not Applicable"

STATEMENT REGARDING FEDERALLY SPONSERED RESEARCH OR DEVELOPEMENT

"Not Applicable"

REFERENCE TO A MICROFICHE APPENDIX

"Not Applicable"

BACKGROUND OF THE INVENTION

Figure 1:
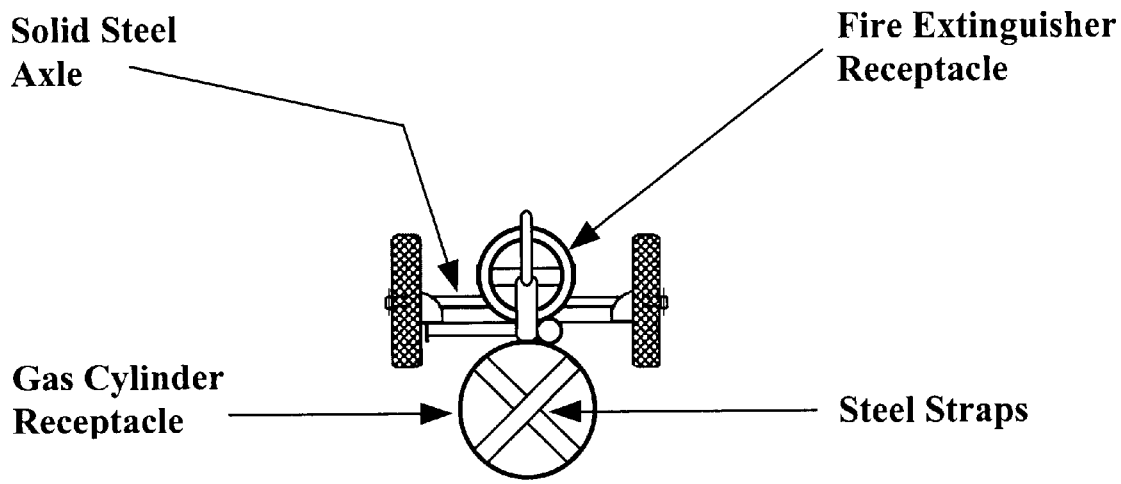

The present invention endeavors to bring about the availability of ultra-safe flammable gas cylinder transport, pursuant to CFR Title:29 (O.S.H.A.), United States Dept. of Labor. Intrinsically, the caddy is a two (2) wheel cart with a cylindrical cagework between both wheels, a fire extinguisher receptacle and an ergonomically considered single tube handle rising vertically from between both wheels to a 4" steel ring at top of handle.

BRIEF SUMMARY OF THE INVENTION

Safety and mobility; coupled with fire suppression ability close at hand are three strong points which attest to the "novelty" of "Roman's Chariot", the invention.

"Portable Gas Cart" is a caddy, or cart of metal construction used for the "safe" transport of welding gas cylinders and supplies.

The present invention exceeds current mandates pertaining to flammable gas cylinder cartage as set forth by the Occupational Safety & Health Administration, Title:29 CFR, (CODE of FEDERAL REGULATION), in that it (the caddy) incorporates an integral fire extinguisher receptor as depicted in the four (4ea.) "Views of the Drawing" herein.

"Unique, is the caddies "Three Point" weight distribution, which leaves its two (2ea.) wheels free-standing, resulting in complete immobility of the cart when not in transport.

"Portable Gas Cart" is constructed with ergonomic consideration, coupling both "form & function".

BRIEF DESCRIPTION OF THE SEVERAL VIEWS OF THE DRAWING (FIG. 1) of the drawing depicts a "TOP VIEW", looking down.

(FIG. 2) of the drawing depicts a "REAR VIEW".

Figure 3:
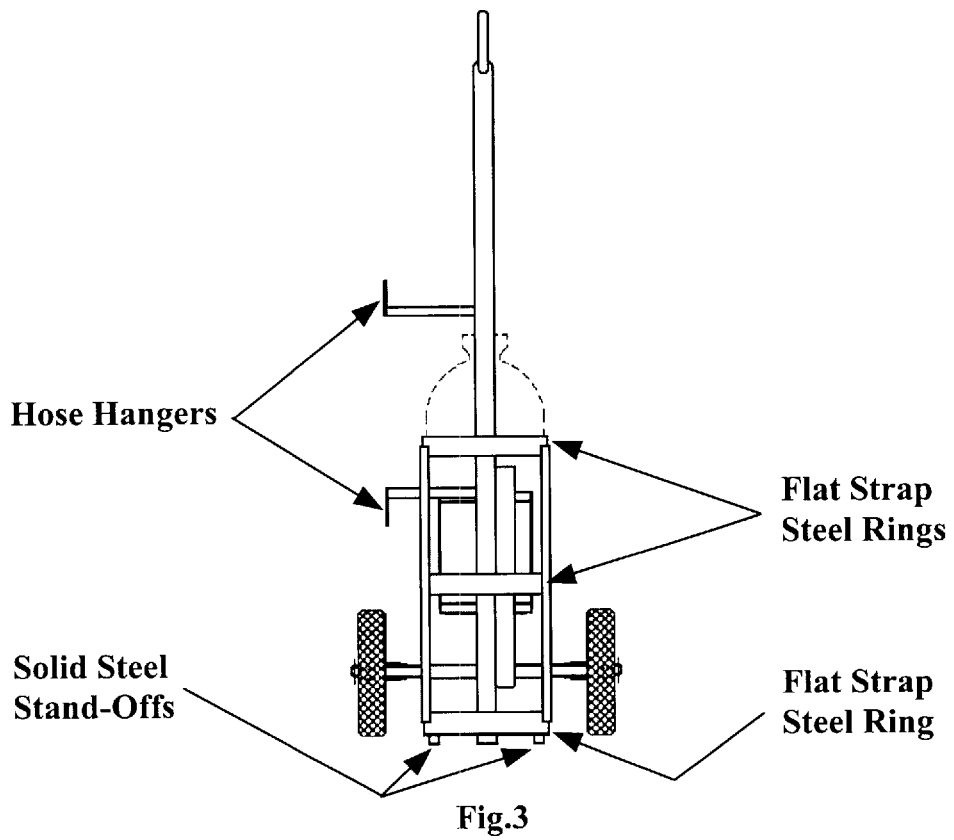

(FIG. 3) of the drawing depicts a "FRONTAL VIEW".

Figure 4:
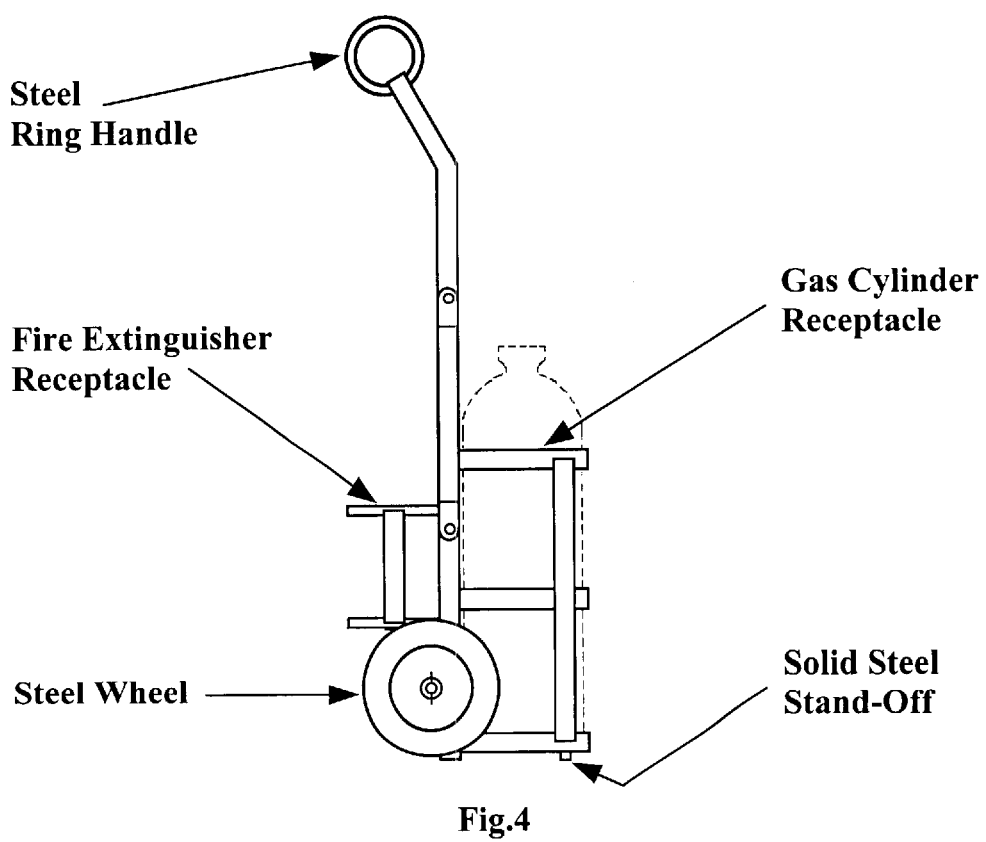

(FIG. 4) of the drawing depicts a "RIGHT SIDE VIEW".

DETAILED DESCRIPTION OF THE INVENTION

The present invention is an all-steel welded caddy, or "utility cart" (with the exception of its two (2ea.) wheels) to be used for the safe transportation of flammable gas cylinders, be they pressurized or liquified.

Born of necessity, through research and by comparison to all other gas cylinder caddies and/or carts of both foreign and domestic make dating from the mid 1800's to the present, it is assessed by the inventor that a more positive gas cylinder retention system coupled with a fire suppression device "close at hand" shall be the standard of the future.

Be it Plumbing, H.V.A.C., or any industry inclusive of the use, transport and storage of flammable gas cylinders, "Roman's Chariot" accommodates a diverse scope of application.

A fully encompassing, circular steel cagework does indeed protect both flammable gas cylinder and regulator or metering device.

The advent of both fire extinguisher receptor (as depicted in "The several views of the drawing"), and a "unique", "three point" weight distribution featuring solid steel standoffs (depicted in FIG. 2) attest to the "novelty" and "usefullness" of the present invention.

The Cart is assembled with the use of pre-formed fashioning devices or "jigs", so as to ensure a uniform and consistent product.

The present invention is made entirely of light weight steel tubing and steel strap with the exception of its two (2) wheels. The following is an itemization and assembly process of the materials which the portable gas cart, consists of.

HANDLE—Consists of 40" of 1" round tubing with a ½"×4" diameter square tube ring at one end. 6" below the 4" steel ring handle a 30 degree angle is bent into the 1"×40" L steel tube in order to facilitate leverage.

ACETYLENE BOTTLE RECEPTOR—Consists of three (3ea.) 7" diameter ⅛"×1" flat strap steel rings which are equidistantly spaced at 0" (base ring) 12" up is the 2nd or (middle ring) with the 3rd or (top ring) at 24" above base ring.

The bottom of said assembly, where flammable gas cylinder bears, are two (2) ⅛"×1"×6"–¾" L flat straps serving a dual purpose in that the top of the two (2) straps being laid one atop the other in a "criss-cross" configuration shall bear the weight of gas cylinder, (approx.50 Lbs.), while underside of these welded "criss-cross" straps will become an integral part of the "unique,three point" weight distribution.

In order that total immobility is achieved by the cart when not in transport, the aformentioned "criss-cross" straps are welded in place at the following locations: (refer to FIG. 1—top view)

With the handle being at 0-degrees of the wheel, the 1st weld point of the "criss-cross" strap configuration is at 45-degrees,2nd @ 135 degrees,3rd @ 225-degrees and 4th weld point @ 315-degrees.

Underneath the "criss-cross" straps at point of perimeter, (7" flat strap base ring) at locations 45-degrees and 315-degrees with base of handle at 180-degrees are welded one(1ea.) ⅜"×½" L solid steel standoffs. This part of the assembly accounts for two (2) of the three solid steel standoffs, whereas the handle itself at base point becomes the third (3rd) standoff which results in the caddies two (2) wheels being off the ground when not in transport.

The acetylene bottle receptor and the handle are the two (2) integral components which enable the "unique", "three point" standoff to come into effect.

FIRE EXTINGUISHER RECEPTOR—Consists of five (5ea.) pieces as follows:

Two (2ea.) 5" diameter tube steel rings (½"×½" tube).

Two (2ea.) ⅛"×1"×6" L flat straps—(sides).

One (1ea.) ⅛"×1"×4" L flat strap—(bottom).

Assembly is as follows:

Both the top and bottom square tube rings are placed in a "jig" which locates and registers both rings directly inline and 7" apart.

Next, 1 of the ⅛"×1"×6" L straps is placed atop both 5" rings in jig and welded in place. The assembly is then inverted and the process repeated.

When done, both side straps should be 180-degrees opposed.

To finish receptor, the remaining ⅛"×1"×4"L strap is then welded onto bottom of assembly inline of side straps.

Figure 2:
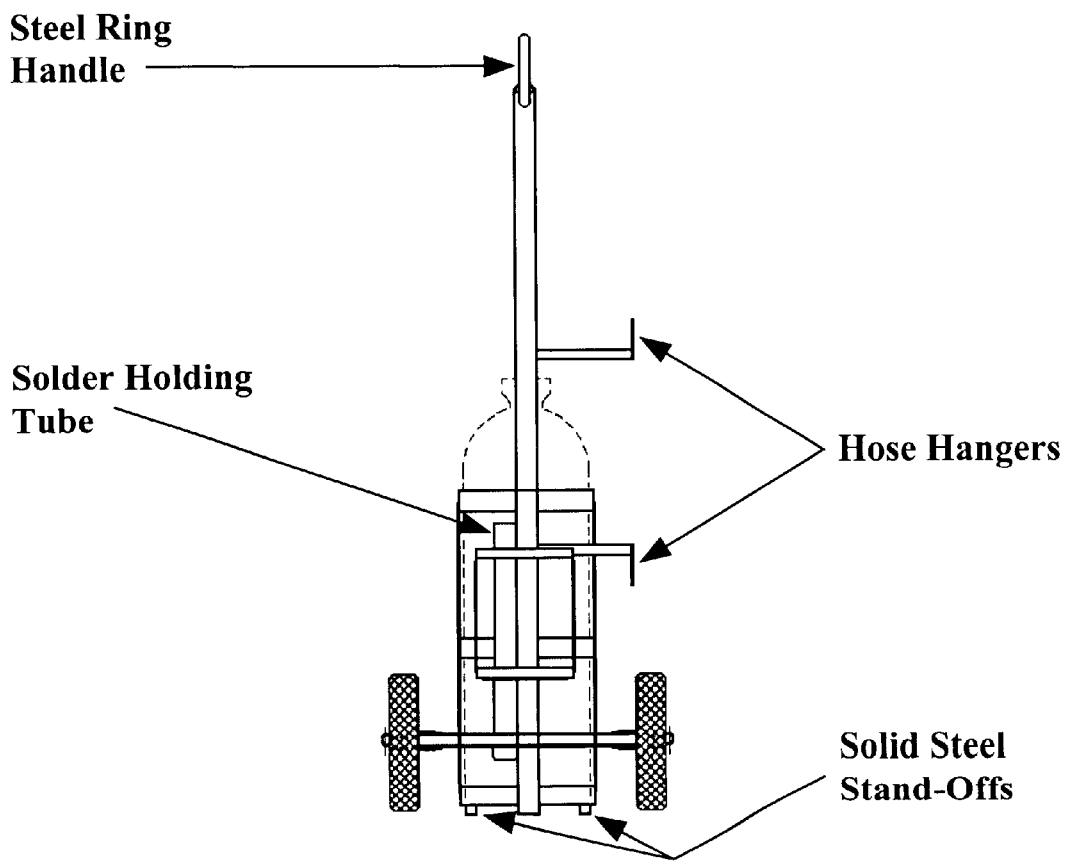

AXLE/WHEEL ASSEMBLY—Consists of the following:
Two (2ea.) female "batwing" type gate hinge parts.
Two (2ea.) 7" diameter steel hub w/rubber tread wheels.
⅜" center hole w/bearings.
Two (2ea.) ⅛"×1" L cotter pins.
One (1ea.) ⅜"×15" L bar stock axle.
One (1ea.) ⅝"×11" L square tube axle support.
Assembly is as follows:

⅝"sq.×11" L axle support tube receives "batwing" type hinge at each end per FIGS. 1&2 of submitted drawing. Hinges to be welded in place.

⅜" round bar axle w/⅛" hole drilled @ ⅜" from both ends is then run through the ⅜" holes in "batwing" hinges on axle support assembly, resulting in positive retention of ⅜" round bar axle, while allowing axle to roll.

Next, the wheels go on, finishing up with a flat washer and cotter pin at each wheel.

HOSE HANGERS—Quantity: (2ea.)

The hose hangers are in fact pre-formed fence anchors that are directly welded to the 1" round tube handle assembly at 14" above unit base (1st hanger), and 28" above base for (2nd hanger) leaving a 14" spread between the two.

SOLDER HOLDING TUBE—Quantity: (1ea.)

The solder holding tube is a 1¼" round tube, capped at one end and with capped end down towards unit base.

The solder holding tube is a dual purpose component in that while holding solder, the tube acts to add integrity and rigidity to entire structure.

CONCOMMITANT ASSEMBLY

Once the five (5) basic component assemblies have been established, the final assemblage of components will result in a useful and unique product ready for the market.

Final assembly is to be done with pre-formed fashioning devices (jigs) so as to ensure a uniform and consistant product.

What is claimed is:

1. A portable gas cylinder cart comprising:

(a) a single tube handle rising vertically from between two wheels;

(b) a round tube ring connected to an end of said handle to facilitate raising or lowering of said cart;

(c) a first receptor comprising two flat straps in a criss-cross configuration at the base of said receptor wherein said straps are capable of bearing the weight of a gas cylinder;

(d) first and second standoffs located on said straps and a third standoff formed integrally with the base of said handle wherein said first, second, and third standoffs remove said wheels from contacting the ground when said cart is not in operation; and (e) a second receptor connected to said handle capable of holding a fire extinguisher.

2. The portable gas cylinder cart as claimed in claim 1, wherein said handle, said tube ring, said straps and said standoffs are steel.

3. The portable gas cylinder cart as claimed in claim 1, wherein said first receptor includes three equidistantly spaced flat strap steel rings.

4. The portable gas cylinder cart as claimed in claim 1, further comprising a solder holding tube directly connected to said handle.

5. The portable gas cylinder cart as claimed in claim 4, wherein said solder holding tube adds rigidity to said cart.

6. The portable gas cylinder cart as claimed in claim 1, wherein said standoffs provide a three point weight distribution when said cart is not in operation.

7. The portable gas cylinder cart as claimed in claim 1, further comprising two hose hangers directly connected to said handle.

\* \* \* \* \*